United States Patent
Dubus et al.

(10) Patent No.: US 10,655,749 B2
(45) Date of Patent: May 19, 2020

(54) VALVE OPERATOR ASSEMBLY WITH CLUTCH MECHANISM AND VALVE EQUIPPED WITH SUCH ASSEMBLY

(71) Applicant: Aktiebolaget SKF, Gothenburg (SE)

(72) Inventors: Jerome Dubus, Aix les Bains (FR); David Richardet, Viviers-du-Lac (FR)

(73) Assignee: Aktiebolaget SKF, Gothenburg (SE)

( * ) Notice: Subject to any disclaimer, the term of this patent is extended or adjusted under 35 U.S.C. 154(b) by 142 days.

(21) Appl. No.: 15/814,562

(22) Filed: Nov. 16, 2017

(65) Prior Publication Data

US 2018/0135773 A1    May 17, 2018

(30) Foreign Application Priority Data

Nov. 17, 2016   (DE) .......................... 10 2016 222 684

(51) Int. Cl.
*F16K 31/50*    (2006.01)
*F16K 3/02*     (2006.01)

(52) U.S. Cl.
CPC .......... *F16K 31/508* (2013.01); *F16K 3/0281* (2013.01)

(58) Field of Classification Search
CPC .... F16K 31/508; F16K 3/0281; F16K 3/0254; F16K 25/04; F16K 31/50; F16H 25/2266; F16H 25/2204; F16H 25/2454; F16H 25/2252; F16H 2025/2071; F16D 41/073
USPC ...................................... 251/79–81, 264–277
See application file for complete search history.

(56) References Cited

U.S. PATENT DOCUMENTS

| | | | |
|---|---|---|---|
| 6,918,574 B2 | 7/2005 | Hallden et al. | |
| 7,736,256 B2 | 6/2010 | Sugitani | |
| 9,140,316 B2 * | 9/2015 | Fenayon | F16C 19/28 |
| 2010/0181160 A1 * | 7/2010 | Suzuki | F16D 41/07 |
| | | | 192/41 A |
| 2014/0054487 A1 | 2/2014 | Namous et al. | |
| 2015/0369001 A1 | 12/2015 | Hoang | |

FOREIGN PATENT DOCUMENTS

| | | |
|---|---|---|
| EP | 1419334 B1 | 11/2006 |
| EP | 1813506 A1 | 8/2007 |
| WO | 20150074699 A1 | 5/2015 |

* cited by examiner

*Primary Examiner* — Craig J Price
*Assistant Examiner* — Andrew J Rost
(74) *Attorney, Agent, or Firm* — Laurence A. Greenberg; Werner H. Stemer; Ralph E. Locher

(57) ABSTRACT

A valve operator assembly having a tubular housing extending along a central axis, an input member rotatably mounted with the housing, a transmission mechanism arranged in an inner bore of the housing and extending along the central axis, the transmission mechanism providing a rotating element connected to the input member and a translating element, the transmission mechanism adapted to convert applied rotation of the input member to the rotating element into axial translation of the translating element. At least one rolling bearing is radially arranged between an inner bore and rotating element to support in rotation and guide the rotating element within the housing. The valve operator assembly includes a clutch mechanism to permit transmission of driving torque from the input member to the rotating element in both directions around the central axis, and prevent any back-driving torque from the rotating element to the input member in either direction.

9 Claims, 4 Drawing Sheets

10,655,749 B2

VALVE OPERATOR ASSEMBLY WITH CLUTCH MECHANISM AND VALVE EQUIPPED WITH SUCH ASSEMBLY

CROSS REFERENCE

This application claims priority to German patent application no. 102016222684.3 filed on Nov. 17, 2016, the contents of which are fully incorporated herein by reference.

FIELD OF THE INVENTION

The present invention relates to the fields of valves and manually operable valves, for instance gate valves, control or regulation valves, blowout preventer valves, or chokes valves. More particularly, the invention relates to a valve operator assembly for a gate valve.

BACKGROUND OF THE INVENTION

Valves are used in a variety of industries to control the flow of fluids. In particular, gate valves are used extensively in the oil and gas industry to control the flow of produced fluids at various stages of drilling or production. Most gate valves used in this industry comprise a valve body having a longitudinal flow bore and a transverse gate cavity that intersects the flow bore. A gate having an opening extending transversely therethrough is disposed in the gate cavity. A valve stem is provided for moving the gate between an open position, in which the gate opening is aligned with the flow bore, and a closed position, in which the gate opening is offset from the flow bore. The gate cavity of the valve body is covered by a bonnet having an axial bore through which passes the valve stem.

Such a gate valve is associated to a valve operator assembly for selectively driving the valve stem up and down in order to close and open the gate valve. A valve operator assembly generally comprises an input member to exert a rotational motion by a manual actuation by a hand-wheel or an electric or pneumatic or hydraulic actuation. The valve operator assembly further comprises a transmission mechanism to convert a rotational motion of the input member into an axial motion of the valve stem. To quickly open and close the gate valve with a minimum number of turns, the transmission mechanism may be a screw mechanism, such as a roller screw mechanism, a ball screw mechanism or an acme screw with or without gear reducer, in order to reduce the operating torque. For more details, it is possible to refer to the patent EP-B1-1 419 334.

Since such a screw mechanism is susceptible to back-drive under fluid pressure, the gate valve can be inadvertently opened or closed. Such back-driving can not only cause problems with the desired flow regulation, but can also lead to injury an operator, for example from being struck by the rotating hand-wheel.

Accordingly, a balance system is generally provided on the valve body of the gate valve to prevent a back-driving of the transmission mechanism with the force exerted by the fluid. Such system comprises a balance stem disposed on the valve body and whish is exposed to fluid pressure to offset or balance the force exerted on the gate.

However, it is necessary to modify the design of the valve body to integrate such a balance system on the gate valve. This leads to a complex structure of the gate valve. Besides, the required space for the gate valve is significantly increased.

EP-A1-1 813 506 discloses a roller screw mechanism for use in an electric power steering device. According to this prior art, a rotation in one direction can be converted to a linear motion by the roller screw mechanism with a high efficiency, while a reversed/back-driving rotation is prevented. The electric power steering device comprises a first and second electric motors to assist the rotation of the rotating elements of the roller screw mechanism, and then decreasing steering load for the driver. The electric motors further make the conversion efficiency to be 0 in the reversed direction.

However, such a device requires electric motors to control the conversion between linear and rotational motions of the roller screw mechanisms. It is then desirable to control reversed rotation only by mechanical and structural design of the roller screw mechanism elements and not by external devices.

BRIEF SUMMARY OF THE INVENTION

It is therefore a particular object of the present invention to overcome these aforementioned drawbacks by providing a valve operator assembly, in particular for valves, which is not reversible or back-driveable and that supports and transmits axial and radial loads, of simple design, that is easy to assemble, economical, able to operate for a long time in both an effective and an economic manner.

The invention concerns a valve operator assembly comprising a tubular housing extending along a central axis, an input member rotatably mounted with respect to the housing, and a transmission mechanism arranged in an inner bore of the housing and extending along the central axis. The transmission mechanism comprises a rotating element connected to the input member and a translating element, the transmission mechanism being adapted to convert applied rotation of the input member to the rotating element into axial translation of the translating element. At least one rolling bearing is radially arranged between an inner bore of the housing and rotating element of the transmission mechanism to support in rotation and guide the rotating element within the housing.

According to the invention, the valve operator assembly further comprises a clutch mechanism to permit transmission of driving torque from the input member to the rotating element in both directions around the central axis, but prevent any back-driving torque from the rotating element to the input member in either direction. The clutch mechanism extends along the central axis, is arranged between the housing and the rotating element, and is provided with:

a casing mounted on the housing by fixing means, a first axial sleeve mounted on the rotating element and a second axial sleeve mounted with the input member, the axial sleeves being axially adjacent one to the other, locking members arranged between the first sleeve and second sleeve, each of the locking members being in contact with the first sleeve and with the second sleeve, in such a way that each of the locking members is in a locked position to lock the second sleeve with the first sleeve when a driving torque in either direction around the central axis is applied to the second sleeve so as to transmit the braking torque from the second sleeve to the first sleeve, the locking members being in an unlocked position when the first sleeve is in back-driving torque in either direction around the central axis, and a first rolling bearing being radially arranged between the first sleeve and an inner bore of the casing, and a second rolling bearing is radially arranged between the second sleeve and the inner bore of the casing.

Thanks to the invention, a driving torque around the central axis of the input member is transmitted to the rotating element of the transmission mechanism via the locked second and first sleeves. The translating member is then put in axial translation along the central axis.

The locking members switch and stay unlock when a back-driving torque is applied to the transmission mechanism, in particular when the translation element applies an ejection force to the translating element in the transmission mechanism, the rotating element being put in rotation by this back-driving torque. The first and second sleeves are unlocked and then no torque is transmitted between them. The input member is not affected by the back-driving torque and stay in static position.

The clutch mechanism is arranged between the transmission mechanism, the housing and the input member on the axial side of the input member. The valve body is standardized and do not need any change. The housing has to be adapted only to be fixed to the casing of the clutch mechanism. The clutch mechanism can be installed directly on the rotating element of the transmission mechanism. All other elements of the transmission mechanism are standardized. Such an assembly is axially compact and can be installed to existing gate valves with few changes.

According to further aspects of the invention, which are advantageous but not compulsory, such a valve operator assembly may incorporate one or several of the following features as long as there is no contradiction:

The rotating element is a nut provided with an inner thread.

The translating element is a screw provided with an outer thread.

The transmission mechanism is a roller screw mechanism wherein rollers are radially provided between the screw and the nut, the rollers comprising each an outer thread cooperating with the inner thread of the nut and with the outer thread of the screw.

The transmission mechanism is a ball screw mechanism wherein balls are radially provided between the screw and the nut, the balls being arranged within the inner thread of the nut and with the outer thread of the screw.

The input member is an operable hand-wheel. Alternatively, the input member is a mechanical operator or a remote operating vehicle.

The rotating element comprises a pin projecting axially towards the input member, the first sleeve of the bi-directional clutch mechanism being mounted on the pin.

The first and second sleeves comprise means to adjust their relative centring position.

One of the sleeves comprises an axial flange that axially protrudes from the sleeve towards the other sleeve, and the other sleeve comprises a groove receiving the flange.

Sealing means are provided between the axial flange and groove of sleeves.

The locking members are sprags.

The sprags are maintained circumferentially equally spaced by a cage.

When the sprags are in an unlocked position, the sprags are in sliding contact with an annular cylindrical contact raceway provided to one of the first and second sleeves.

One of the sleeves comprises circumferentially a plurality of cavities wherein the sprags are arranged, the cavities comprising lateral guiding portions on which the sprags are dedicated to come in abutment. Torque is transmitted between the sprags and the lateral guiding portions. The lateral guiding portions are designed to switch the sprags into a locked position or an unlocked position when the sprags come in abutment against the lateral guiding portions.

Lateral guiding portions consist each in an inclined wall.

Each cavity comprises a pair of lateral guiding portions between which a sprag is circumferentially arranged, the sprag coming in abutment against a first lateral guiding portion in a first rotating direction around the central axis, and coming in abutment against a second lateral guiding portion in a second rotating direction around the central axis opposite to the first direction.

Cavities are provided to a radial annular ring that radially outwardly extends from the sleeve, the cavities being formed on a radial surface of the ring that is axially facing the other sleeve.

The radial annular ring is formed integrally with the sleeve.

The radial annular ring is secured to the sleeve by appropriate fixing means.

Each sprag comprises a body with a lower end in contact with an annular cylindrical contact raceway provided to one of the sleeves. The lower end comprises a first contact surface dedicated to contact the annular cylindrical contact raceway, the first contact surface being locked to the annular cylindrical contact raceway in a first rotating direction around the central axis and sliding on the annular cylindrical contact raceway in a second rotating direction around the central axis opposite to the first direction. The lower end further comprises a second contact surface dedicated to contact the annular cylindrical contact raceway, the second contact surface being locked to the annular cylindrical contact raceway in the second rotating direction and sliding on the annular cylindrical contact raceway in the first rotating direction opposite to the second direction.

Each sprag is arranged in a given cavity between two lateral guiding portions and comprises a body with a lower end in contact with an annular cylindrical contact raceway provided to one of the sleeves. The sprag is in a first position in the cavity when the body contacts a first lateral guiding portion, the first contact surface of the lower end being in contact with the annular cylindrical contact raceway. The sprag is in a second position in the cavity when the body contacts a second lateral guiding portion, the second contact surface of the lower end being in contact with the annular cylindrical contact raceway.

The invention also relates to a valve, notably a gate valve, a control or regulation valve, a blowout preventer valve or a choke valve comprising a valve body provided with a valve bonnet and a valve housing covered by the bonnet, a valve translating member axially moveable, an operator assembly according to any of the preceding embodiments, the valve translating element being fixed in translation to the translating element of the transmission mechanism and the valve body being fixed to the housing of operator assembly.

The valve translating member may be a valve stem or a piston for instance.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which.

DETAILED DESCRIPTION OF THE INVENTION

Figure 1:
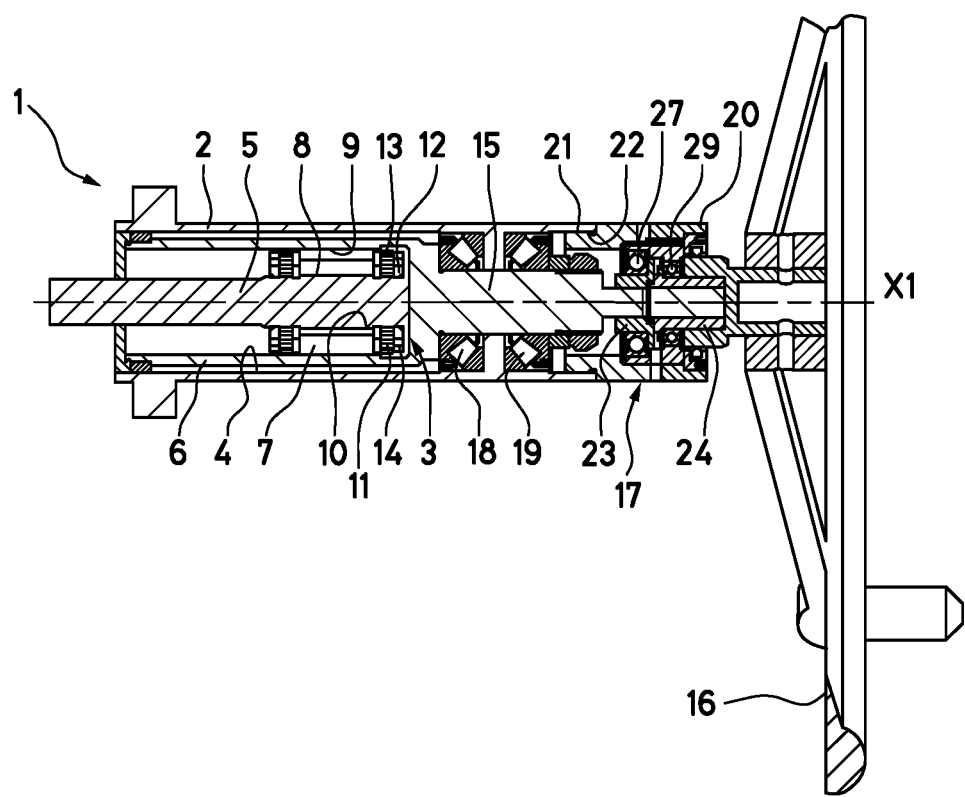
FIG. 1 is a sectional view of an operator assembly according to a first embodiment of the invention.
Figure 2:
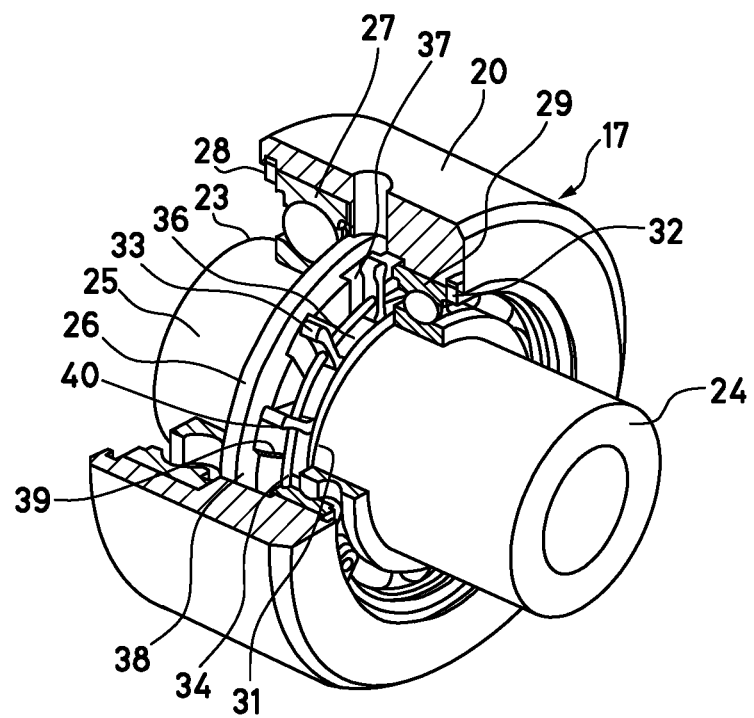
FIG. 2 is a detailed perspective cut view of a clutch mechanism of the assembly of FIG. 1.
Figure 3:
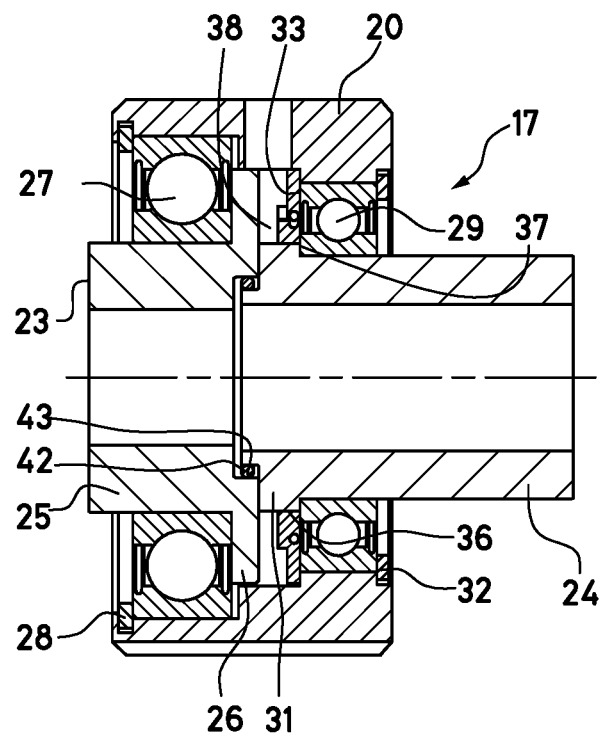
FIG. 3 is a sectional view of the clutch mechanism of FIG. 2.

In FIG. 1, an operator assembly 1, of central axis X1, comprises a housing 2 and a transmission mechanism 3. Hereinafter, the adjectives "axial" and "radial" are defined relative to the central axis X1 of the operator assembly 1.

Housing 2 consists in a tubular cylinder provided with a bore 4. According to a not shown embodiment, the bore 4 may be stepped. Housing 2 is centered to the central axis X1.

Transmission mechanism 3 is radially arranged within the bore 4 of housing 2. In the embodiment illustrated in FIG. 1, transmission mechanism 3 is a roller screw mechanism comprising a screw 5, a nut 6 and rollers 7. Screw 5 is provided with a threaded outer surface 8. The nut 6 is mounted coaxially about the screw 5 and is provided with a threaded inner surface 9. A plurality of longitudinal rollers 7 is disposed radially between the screw 5 and the nut 6.

The screw 5 extends longitudinally through a cylindrical bore of the nut 6 on which the threaded inner surface 9 is formed. The nut 6 has a tubular form and is elongated to accommodate the full extent of screw travel.

The rollers 7 are identical to each other and are distributed regularly around the screw 5. Each roller 7 extends along an axis which is parallel with the central axis X1 and comprises an outer thread 10 engaging the thread 9 of the nut 6 and the thread 8 of the screw 5. Each roller 7 also comprises, at each axial end, outer gear teeth 11 extending axially outwards the outer thread 10 and which are themselves extended axially by a cylindrical stud 12 extending outwards.

The outer gear teeth 11 are meshed by annular gear wheels 13 provided on the outer surface of the screw 5. Each annular gear wheel is axially located near to an end of the threaded outer surface 8 of screw 5, the threaded outer surface 8 being axially located between the gear wheels 13.

The cylindrical studs 12 on axial ends of the rollers 7 are housed in cylindrical through-recesses provided on spacer rings 14 (or annular guides). Spacer rings enable the rollers 7 to be carried and the regular circumferential spacing thereof to be kept. The spacer rings 14 are radially disposed between the screw 5 and the threaded inner surface 9 of nut 6 without contacting with the thread. Each spacer ring 14 is mounted on the outer surface of the screw 5 axially next to an associated gear wheel 13. The spacer rings 14 are hold on the outer surface of the screw 5 by any appropriate means. As a non-illustrated embodiment, spacer rings may be hold on the screw by a retainer ring on one side and by a shoulder on the axially opposite side.

The threaded screw is adapted to be secured to a translating element such as a valve stem (not shown) and transmit a translating movement. On the opposite axial side, the nut is closed on one end and radially extended by a nut connecting portion 15. In the embodiment of FIG. 1, the connecting portion 15 is formed integral with the nut 6. Alternatively, the connecting portion 15 may be a remote element secured to the nut 6.

The nut connecting portion 15 is adapted to be fasten in rotation with an input wheel 16 by the intermediate of a clutch mechanism 17 that will further described below. Alternatively, the transmission mechanism 3 may be actuated by a remote operating vehicle or an electromechanical actuator.

The valve operator assembly 1 further comprises two rolling bearings 18, 19 to guide the rotation of the nut 6 of the roller screw mechanism 3 relative to the housing 2. The rolling bearings 18, 19 are radially mounted between the outer surface of the nut connecting portion 15 and the bore 4 of housing 2. In the embodiment of FIG. 1, the rolling bearings 18, 19 are two angular contact spherical roller bearings but can be of any other types.

According to the invention, the valve operator assembly 1 further comprises a clutch mechanism 17 to permit transmission of driving torque from the input wheel 16 to the rotating nut 6 in both directions around the central axis X1, but prevent any back-driving torque from the rotating nut 6 to the input wheel 16 in either direction. The clutch mechanism 17 extends along the central axis X1 and is arranged between the housing 2 and the rotating nut 6.

The clutch mechanism 17 comprises a casing 20 mounted on the housing 2 by any appropriate fixing means. In the embodiment of FIG. 1, the casing 20 and the housing 2 are provided with threaded portions 21, 22 respectively, meshing one to the other. As an alternate not shown, casing 20 may be secured to the housing 2 by screws.

The clutch mechanism comprises a first axial sleeve 23 secured to the connecting portion 15 of the rotating nut 6, and a second axial sleeve 24 secured to the input wheel 16. The axial sleeves 23, 24 are elongated along the central axis X1 and are axially adjacent one to the other.

The first sleeve 23 comprises a cylindrical body 25 centered on the central axis X1, and an annular radial flange 26 extending radially outwardly from the cylindrical body 25 and directed towards the casing 20. The flange 26 is axially positioned on the side of the second sleeve 24. A first ball bearing 27 is radially arranged between an outer cylindrical surface of the body 25 and an inner bore of the casing 20. The flange 26 forms a first axial blocking means for the ball bearing 27 on one axial side, a ring 28 forming a second axial blocking means in the opposite axial side.

The second sleeve 24 comprises a cylindrical body 29 centered on the central axis X1. A second ball bearing 30 is radially arranged between an outer cylindrical surface of the body 29 and an inner bore of the casing 20. A radial shoulder flange 31 forms a first axial blocking means for the ball bearing 30 on one axial side towards the first sleeve 23, a ring 32 forming a second axial blocking means in the opposite axial side.

The first and second sleeves 23, 24 comprise means to adjust their relative centering position. The second sleeve 24 comprises an annular axial flange 41 that axially protrudes from the sleeve 24 towards the other sleeve 23. The first sleeve 23 comprises an annular groove 42 receiving the flange 41. An annular sealing ring 43 is radially arranged between the flange 41 and the groove 42.

The clutch mechanism 17 further comprises a plurality of sprags 33 arranged between the first sleeve 23 and second sleeve 24 so as to transmit driving torque from the second sleeve 23 to first sleeve 24 in any rotating direction around the central axis, and to block any back-driving torque in either direction from the first sleeve 23 to second sleeve 24. Sprags 33 are maintained circumferentially equally spaced by a cage 34.

As shown in FIGS. 4a to 4d, sprags 33 comprise each a body 34 with a lower end 35 in contact with an annular cylindrical contact raceway 36 provided to the second sleeve 24.

Sprags 33 are circumferentially arranged around the raceway 36 in cavities 37 provided to an annular radial ring 38. The cavities 37 are formed on a radial surface of the ring 38 that is axially facing the second sleeve 24. The radial annular ring 38 is secured to the flange 26 of the first sleeve 23. As an alternate not shown, the ring 38 is formed integrally with the sleeve 23.

Each of the cavities 37 defines a pair of lateral guiding walls 39, 40 between which is circumferentially arranged a sprag 33. Lateral guiding walls 39, 40 are inclined with respect to the other and adjusted to set two possible positions of the sprag 33.

Figure 4A:
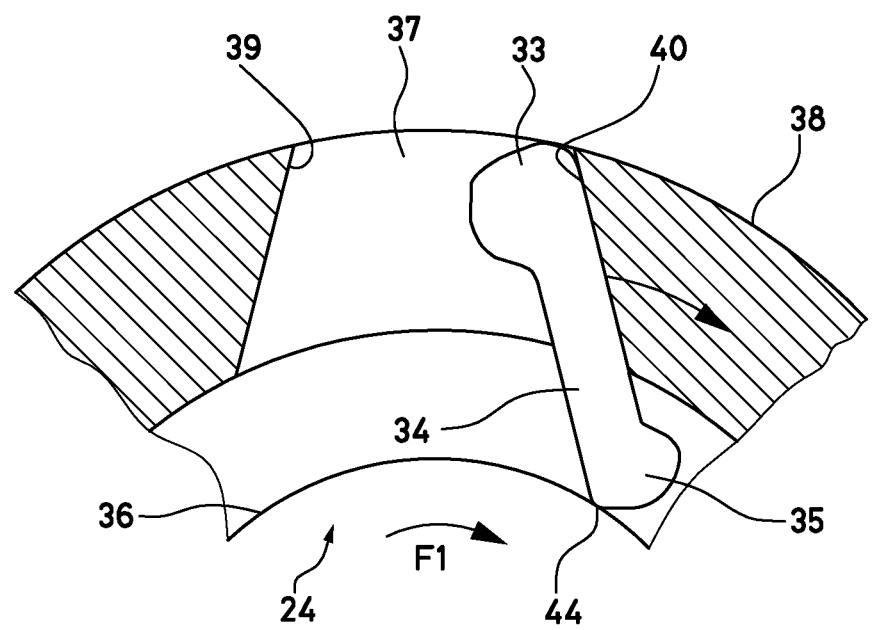
FIGS. 4a to 4d are detailed views of the positions of sprags in the clutch mechanism.
Figure 4B:
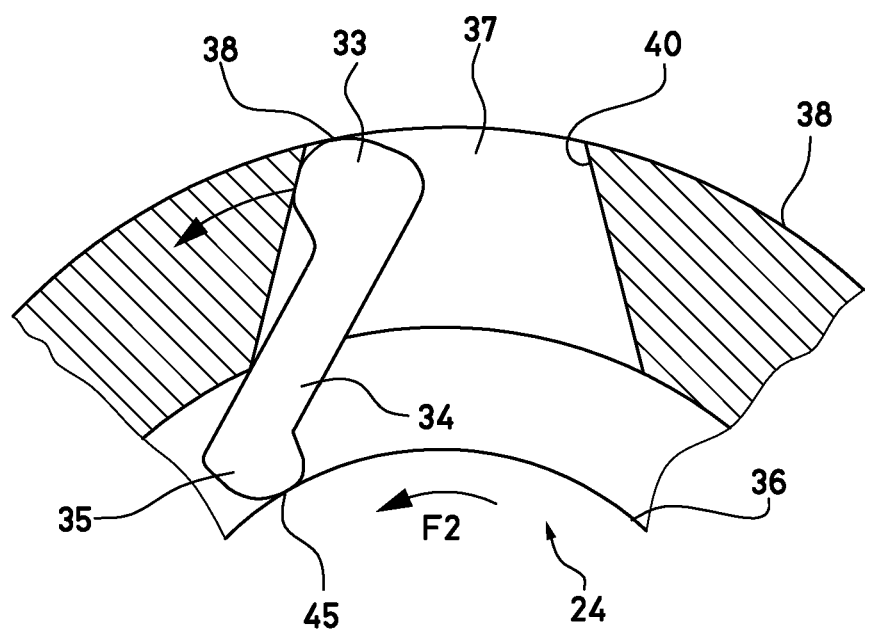

The cavities 37 and their associated sprags 33 are designed so that the clutch mechanism works as followed and illustrated in FIGS. 4a to 4b.

As illustrated in FIG. 4a, an input driving rotating torque F1 is applied from the input wheel 16 to the second sleeve 24 in a first rotating direction around the central axis X1. The annular raceway 36 in rotation put in movement the sprags 33 in the direction up to come into abutment against a first lateral guiding wall 40. The sprags 33 are then set in a first position in their corresponding cavities 37, the lower end 35 of each of the sprags 33 being in contact with the raceway 36 by a first contact surface 44.

In this first position of the sprags 33 and in this first driving torque F1 from the second sleeve 24, the sprags 33 are locked in the first position. More precisely, the first contact surface 44 of each sprag 33 is coupled in rotation with the raceway 36. The driving torque F1 is then transmitted from the second sleeve 24 to the sprags 33.

The sprags 33 are each in abutment against the first lateral guiding wall 40 of the cavity 37. The driving torque F1 is then transmitted from the sprag 33 to the annular ring 26, hence to the first sleeve 23 secured to the ring 26.

The clutch mechanism 17 transmits the driving torque F1 from the input wheel 16 to the transmission mechanism 3, and more particularly to the nut 6 secured to the first sleeve 23 of the clutch mechanism 17. Rollers 7 roll on the inner thread 9 of nut 6 and transmit movement to the outer thread 8 of screw 5. The screw 5 axially translates along the central axis X1 and transmits an output translating movement in a first axial direction to the translating element. As another embodiment, the driving torque can be applied from the input wheel to the screw 5. Rollers 7 roll on the outer thread 8 of screw 5 and transmit movement to the inner thread 9 of nut 6. The nut 6 translates along the central axis X1 and transmits an output translating movement to the translating element.

As illustrated in FIG. 4b, an input driving rotating torque F2 is applied from the input wheel 16 to the second sleeve 24 in a second rotating direction around the central axis X1 opposite to the first direction of F1. The annular raceway 36 in rotation put in movement the sprags 33 in the second direction up to come into abutment against a second lateral guiding wall 39. The sprags 33 are then set in a second position in their corresponding cavities 37, the lower end 35 of each of the sprags 33 being in contact with the raceway 36 by a second contact surface 45.

In this second position of the sprags 33 and in this second driving torque F2 from the second sleeve 24, the sprags 33 are locked in the second position. More precisely, the second contact surface 45 of each sprag 33 is coupled in rotation with the raceway 36. The driving torque F2 is then transmitted from the second sleeve 24 to the sprags 33.

The sprags 33 are each in abutment against the second lateral guiding wall 39 of the cavity 37. The driving torque F2 is then transmitted from the sprag 33 to the annular ring 26, hence to the first sleeve 23 secured to the ring 26.

The clutch mechanism 17 transmits the driving torque F2 from the input wheel 16 to the transmission mechanism 3, and then imply an output translating movement in a second direction along the central axis X1 opposite to the first translating movement.

Thanks to the invention, the input driving torque exerted by the input wheel 16 in either direction around the central axis X1 is converted into an output translating movement along the central axis X1 of a translating element.

Figure 4C:
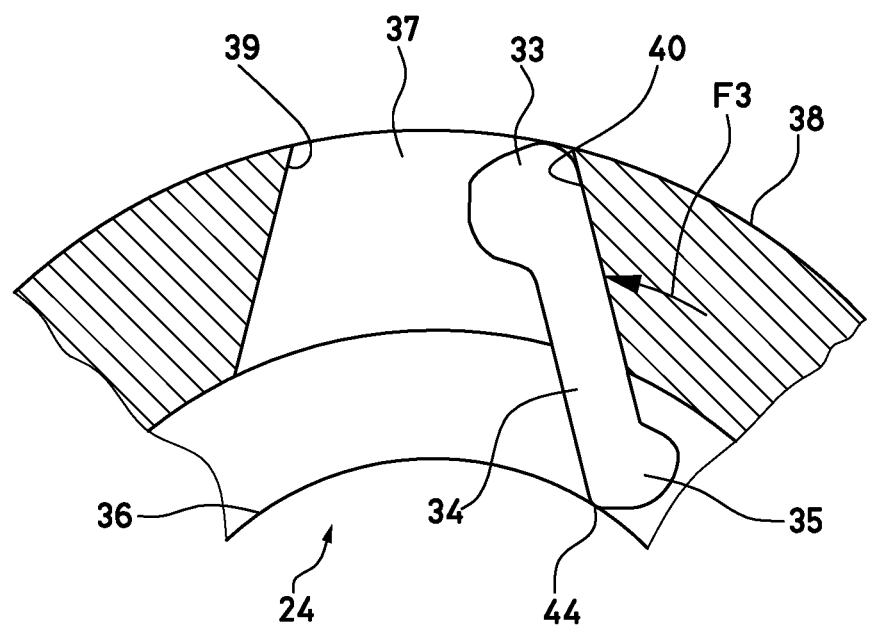

As illustrated in FIG. 4c, an input back-driving rotating torque F3 is applied by the nut 6 to the second sleeve 24 in the second rotating direction around the central axis X1. The annular ring 26 is in rotation in the direction, the first lateral guiding walls 40 coming into abutment against the sprags 33. The driving torque F3 is then transmitted from the first sleeve 23 to the sprags 33. The sprags 33 are then set in the first position in their corresponding cavities 37, the lower end 35 of each of the sprags 33 being in contact with the raceway 36 by the first contact surface 44.

In this first position of the sprags 33 and in this driving torque F3 in the second direction from the first sleeve 23, the sprags 33 are unlocked in the first position. More precisely, the first contact surface 44 of each sprag 33 is in sliding contact with the raceway 36. The driving torque F3 is then not transmitted from sprags 33 to the second sleeve 24. The first and second sleeves are not coupled in rotation in that case.

Figure 4D:
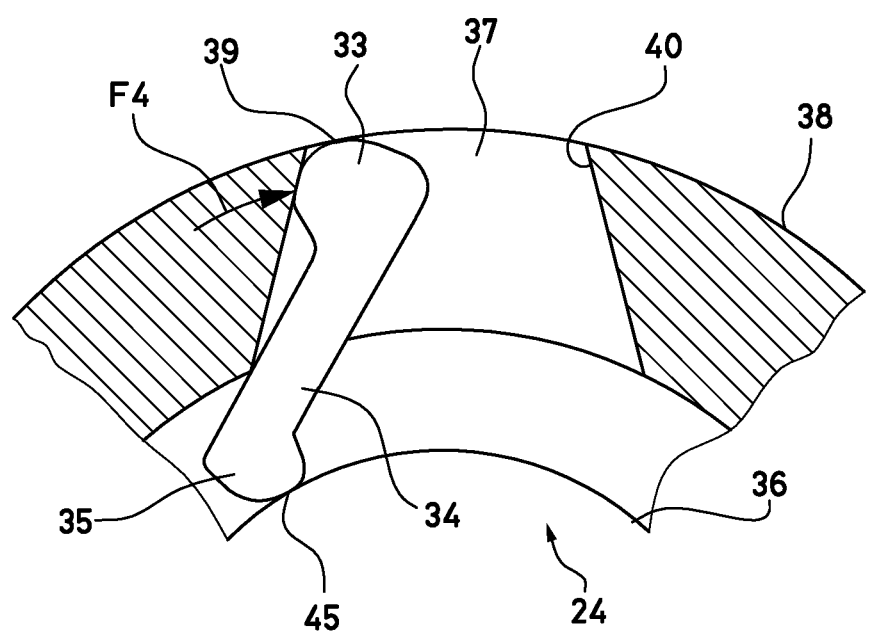

As illustrated in FIG. 4d, an input back-driving rotating torque F4 is applied by the nut 6 to the second sleeve 24 in the first rotating direction around the central axis X1. The annular ring 26 is in rotation in the direction, the second lateral guiding walls 39 coming into abutment against the sprags 33. The driving torque F4 is then transmitted from the first sleeve 23 to the sprags 33. The sprags 33 are then set in the second position in their corresponding cavities 37, the lower end 35 of each of the sprags 33 being in contact with the raceway 36 by the second contact surface 45.

In this second position of the sprags 33 and in this driving torque F4 in the first direction from the first sleeve 23, the sprags 33 are unlocked in the second position. More precisely, the second contact surface 45 of each sprag 33 is in sliding contact with the raceway 36. The driving torque F4 is then not transmitted from sprags 33 to the second sleeve 24. The first and second sleeves are not coupled in rotation in that case.

The input member 16 is not affected by the back-driving torques F3, F4 and stay in static position.

Figure 5:
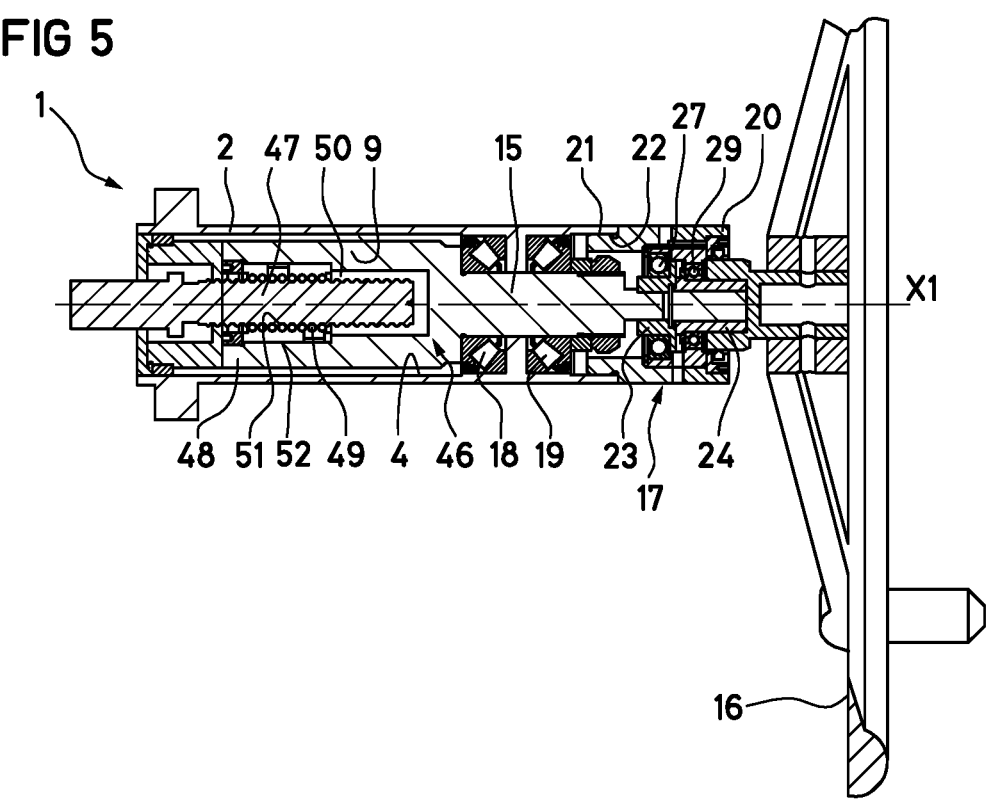
FIG. 5 is a sectional view of an operator assembly according to a second embodiment of the invention.

Although the present invention has been illustrated using a roller screw mechanism as transmission mechanism, it will be understood that the invention can be applied without major modification to valve operator assembly using any other type of transmission mechanism, such as recirculating roller screw mechanism, friction screw mechanism, or a ball screw mechanism as illustrated in FIG. 5.

The second embodiment of the invention illustrated in FIG. 5, wherein the same elements have the same reference numbers, differs from the first embodiment in that the operator assembly 1 comprises a ball screw mechanism 46 arranged in the bore 4 of housing 2.

Ball screw mechanism 46 comprises a screw 47, a nut 48 and balls 49. Screw 47 is provided with a threaded outer surface 50. The nut 48 is mounted coaxially about the screw 47 and is provided with a threaded inner surface 51. A plurality of balls 49 are disposed radially between the screw 47 and the nut 48, the balls being engaged in the inner thread 51 of nut 48 and in the outer thread 50 of screw 47. In this embodiment, the inner thread 51 of nut 48 is provided to a recirculating element 52 fastened in bore of the nut 48.

Although the embodiments of FIGS. 1 and 5 have been illustrated on the basis of a valve operator assembly for gate valve, it should be understood that the invention can also be used with other types of valves, for instance control or regulation valves, blowout preventer valves or choke valves. The operator assembly may be used for instance with a surface gate or a subsea valve gate which may be actuated by a remote operating vehicle or an actuator.

The embodiments disclosed in the description may be arranged or combined together and are still within the meaning of the present invention.

The invention claimed is:

1. A valve operator assembly comprising:
    a tubular housing extending along a central axis,
    an input member rotatably mounted with respect to the housing,
    a transmission mechanism arranged in an inner bore of the housing and extending along the central axis, the transmission mechanism providing a rotating element connected to the input member and a translating element, the transmission mechanism adapted to convert applied rotation of the input member to the rotating element into axial translation of the translating element,
    at least one rolling bearing radially arranged between an inner bore of the housing and the rotating element of the transmission mechanism to support in rotation and guide the rotating element within the housing,
    the valve operator assembly further provides a clutch mechanism to permit transmission of a driving torque from the input member to the rotating element in both directions around the central axis, and prevent any back-driving torque from the rotating element to the input member in either direction, the clutch mechanism extending along the central axis, arranged between the housing and the rotating element, and provided with:
    a casing mounted on the housing by fixing means,
    a first axial sleeve mounted on the rotating element and a second axial sleeve mounted with the input member, the axial sleeves being axially adjacent one to the other,
    locking members arranged between the first sleeve and second sleeve, each of the locking members being in contact with the first sleeve and with the second sleeve, in such a way that each of the locking members is in a locked position to lock the second sleeve with the first sleeve when the driving torque in either direction around the central axis is applied to the second sleeve to transmit the braking torque from the second sleeve to the first sleeve, the locking members being in an unlocked position when the first sleeve is in back-driving torque in either direction around the central axis, and
    a first rolling bearing being radially arranged between the first sleeve and an inner bore of the casing, and a second rolling bearing is radially arranged between the second sleeve and the inner bore of the casing.

2. The valve operator assembly according to the claim 1, wherein one of the first sleeve and second sleeve comprises an axial flange that axially protrudes from the sleeve towards the other sleeve, and the other sleeve provides a groove receiving the axial flange to adjust their relative centering position.

3. The valve operator assembly according to claim 1, wherein the locking members are sprags.

4. The valve operator assembly according to the claim 3, wherein when the sprags are in an unlocked position, the sprags are in sliding contact with an annular cylindrical contact raceway provided to one of the first sleeve and second sleeve.

5. The valve operator assembly according to claim 3, wherein one of the first sleeve and second sleeve comprises circumferentially a plurality of cavities where the sprags are arranged, the cavities comprising lateral guiding portions on which the sprags are dedicated to come in abutment, torque being transmitted between the sprags and the lateral guiding portions, the lateral guiding portions configured to switch the sprags into a locked position or an unlocked position when the sprags come in abutment against the lateral guiding portions.

6. The valve operator assembly according claim 5, wherein each cavity comprises a pair of lateral guiding portions between which a sprag is circumferentially arranged, the sprag coming in abutment against a first lateral guiding portion in a first rotating direction around the central axis, and coming in abutment against a second lateral guiding portion in a second rotating direction around the central axis opposite to the first direction.

7. The valve operator assembly according to claim 5, wherein the cavities are provided to a radial annular ring that radially outwardly extends from the sleeve, the cavities being formed on a radial surface of the ring that is axially facing the other sleeve.

8. The valve operator assembly according to claim 3, wherein each sprag comprises a body with a lower end in contact with an annular cylindrical contact raceway provided with one of the sleeves, the lower end having a first contact surface dedicated to contact the annular cylindrical contact raceway, the first contact surface being locked to the annular cylindrical contact raceway in a first rotating direction around the central axis and sliding on the annular cylindrical contact raceway in a second rotating direction around the central axis opposite to the first direction, the lower end including a second contact surface dedicated to contact the annular cylindrical contact raceway, the second contact surface being locked to the annular cylindrical contact raceway in the second rotating direction and sliding on the annular cylindrical contact raceway in the first rotating direction opposite to the second direction.

9. The valve operator assembly according to claim 8, wherein each sprag is arranged in a given cavity between two lateral guiding portions and the lower end is in contact with the annular cylindrical contact raceway provided to one of the sleeves, the sprag being in a first position in the cavity when the body contacts a first lateral guiding portion, the first contact surface of the lower end being in contact with the annular cylindrical contact raceway, the sprag being in a second position in the cavity when the body contacts a second lateral guiding portion, the second contact surface of the lower end being in contact with the annular cylindrical contact raceway.

* * * * *